United States Patent [19]

Monroe et al.

[11] 4,426,955

[45] Jan. 24, 1984

[54] IDENTIFICATION AND ANIMAL FEEDING APPARATUS

[75] Inventors: Marvin E. Monroe; William T. Kavage, both of Sunbury, Ohio

[73] Assignee: Optek, Inc., Galena, Ohio

[21] Appl. No.: 331,233

[22] Filed: Dec. 16, 1981

[51] Int. Cl.³ .............................................. A01K 5/02
[52] U.S. Cl. .................................. 119/51 R; 335/206
[58] Field of Search ............ 119/51 R; 335/206, 207, 335/188; 340/166 S

[56] References Cited

U.S. PATENT DOCUMENTS

| | | | |
|---|---|---|---|
| 3,581,030 | 5/1971 | Sedley | 335/206 |
| 3,850,145 | 11/1974 | Yoder et al. | 119/51 R |
| 4,162,683 | 7/1979 | Brooks | 119/51 R |
| 4,279,219 | 7/1981 | Brooks | 119/51 R |

*Primary Examiner*—Jay N. Eskovitz
*Attorney, Agent, or Firm*—Frank H. Foster

[57] ABSTRACT

An animal identification and feeding apparatus having a plurality of tags, one suspended from each animal, each tag having a plurality of pockets into which either permanent magnets or non-magnetic filler strips are press fit to form a code. The code is detected by a plurality of spaced reed switches having field modifying magnets interposed between the reed switches. The tag magnets and the field modifying magnets are polarized along an axis of magnetization which is perpendicular to their interfacing surfaces and they are aligned with repelling poles facing each other.

12 Claims, 7 Drawing Figures

MAGNET

PLASTIC

IDENTIFICATION AND ANIMAL FEEDING APPARATUS

TECHNICAL FIELD

This invention relates to automated, computercontrolled agricultural equipment and more particularly relates to a feeding system which permits the farmer to select the feed ration for each individual animal, such as each cow of a dairy herd and automatically make available to each animal the desired feed ration throughout each day. The apparatus combines the convenience of self feeding with the flexibility and accuracy of individual ration selection.

BACKGROUND ART

Agricultrual animals have been fed for centuries by grazing and periodic feeding of harvested feeds in feed troughs and bunks in which the feed is simultaneously available to all animals. Such methods are still adequate where feed costs are low.

However, where the feed costs are high, production efficiency must be improved by feeding to maximize production for each animal.

Although each animal could be separately isolated and individually fed, such a feeding technique would require very high labor expenses and a significant investment in equipment.

One advance towards the solution of this problem is described in U.S. Pat. No. 3,850,145 to David A. Yoder, et al. In this system supplemental feeding is available to selected animals. Each selected animal wears a tag suspended from its neck. Supplemental feeders are stationed in the feed lot and are actuated to supply feed when an animal wearing a tag inserts its head into the feeder. The presence of the tag is sensed and actuates the feeder.

However, such a feeding system is limited because all the tags are identical and the detecting unit of the feeder merely detects the presence or absence of the tag. Thus, all selected animals are given the same supplemental feed. Additionally, there is no feed limitation so that the selected animals have available all the feed they choose while non-selected animals have no supplemental feed available to them.

It is therefore an object of the present invention to provide an agricultural livestock feeding system which allows the farmer to predetermine the feed ration to be made available each day for each individual animal. The apparatus individually identifies each animal which presents itself to the feeder and makes available to that animal the amount of feed chosen by the farmer for that particular animal. The apparatus also stores data representing the cumulative total of feed provided to an animal in a selected time period and makes no further feed available during the time period after the selected ration for that animal has been consumed. In this manner the production efficiency of each individual animal may be controlled with precision and optimized.

It is another object of the invention to provide an identification system having durable identification tags which are entirely passive and thus are inexpensive and not subject to failure due to thermal, mechanical and electrical stress to the extent of tags containing active devices and batteries. Such tags provide reliable data over a long lifetime.

Another object of the invention is to provide an identification system which does not require a close tolerance mating or registration between the identification tags and the detecting unit.

Another object of the present invention is to provide a sensing system which is both inexpensive and reliable.

Yet another object of the invention is to construct a magnetic sensing utilizing reed switches and to use them in a manner which eliminates the possibility of inactive dead spots and which permits adjustment of the reed switches so that all will close with approximately the same magnetic field from the tag.

BRIEF DISCLOSURE OF THE INVENTION

The invention includes a detecting apparatus mounted near the feeder and having a plurality of magnetically actuable switches, such as reed switches, spaced along a support.

A tag or other coded object may be suspended from the animal's neck and is provided with a plurality of positions having substantially the same spacing as the magnetically actuable switches. Magnets, such as permanent ferrite magnets, are mounted at selected ones of the positions and the other positions are maintained with nonmagnetic material to form a code. An electronic computer is connected to the magnetically actuable switches and to a feed conveyor. The computer detects the actuated switches and actuates the feeder in response to the detected code word which is associated with each particular animal.

Preferably, field modifying magnets are interspaced along the detector support between the magnetically actuable switches. The field modifying magnets and the tag magnets have their axis of magnetization transverse to their interfacing surfaces causing the proper alignment of the tag and attraction of it to the detector at the proper position opposite the switches.

Figure 1:
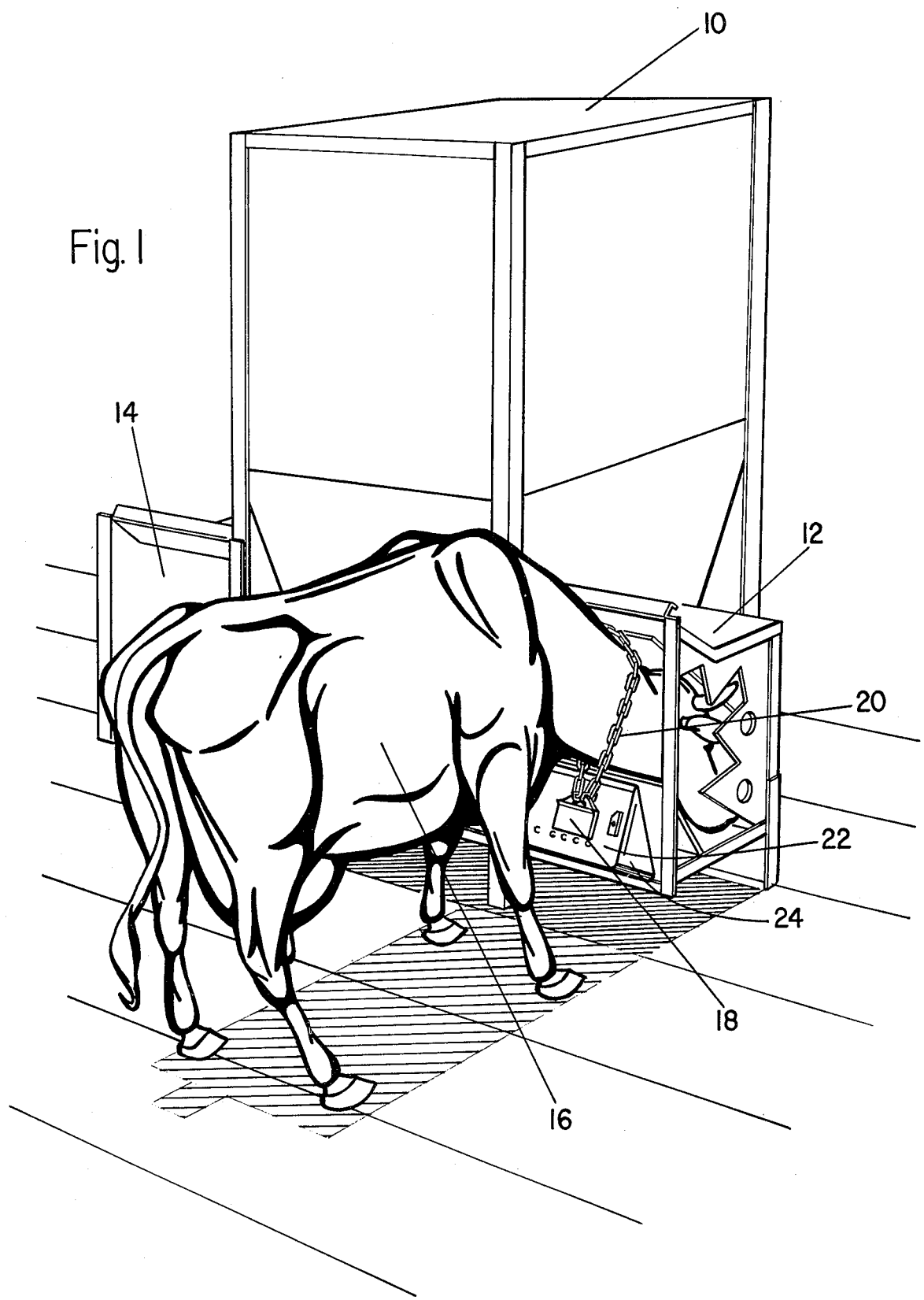
FIG. 1 is a view in perspective of a dairy cow feeding at an apparatus embodying the present invention.

In describing the embodiment of the invention illustrated in the drawings specific terminology will be resorted to for the sake of clarity. However, it is intended that each specific term includes all technical equivalents which operate in a similar manner to accomplish a similar purpose.

DESCRIPTION OF THE BEST MODE FOR CARRYING OUT THE INVENTION

FIG. 1 illustrates a feed storage and supply hopper 10 which is internally connected to a pair of electrically actuable feeders 12 and 14. An electrically actuable feeder has a receptacle to which feed is supplied by a conveyor, such as an auger, which is electrically driven. Ordinarily feed is delivered at a continuous rate when the conveyor drive motor is actuated so that the total time of actuation is proportional to the total feed made available to the animal.

In FIG. 1 a dairy cow 16 is positioned with her head extended into the feeder. She has an identification tag 18 which is suspended from her neck by a chain 20 and which lays against the included front surface panel 22 of the detector 24.

Figure 2:
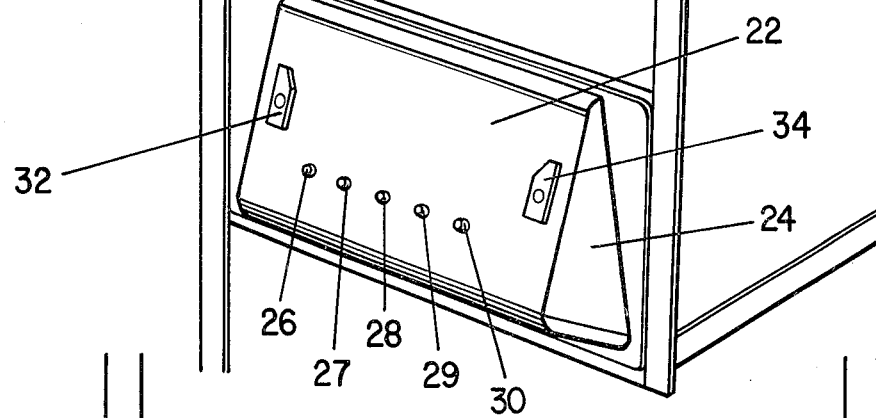
FIG. 2 is a view in perspective illustrating the detector portion of the embodiment illustrated in FIG. 1.
Figure 3:
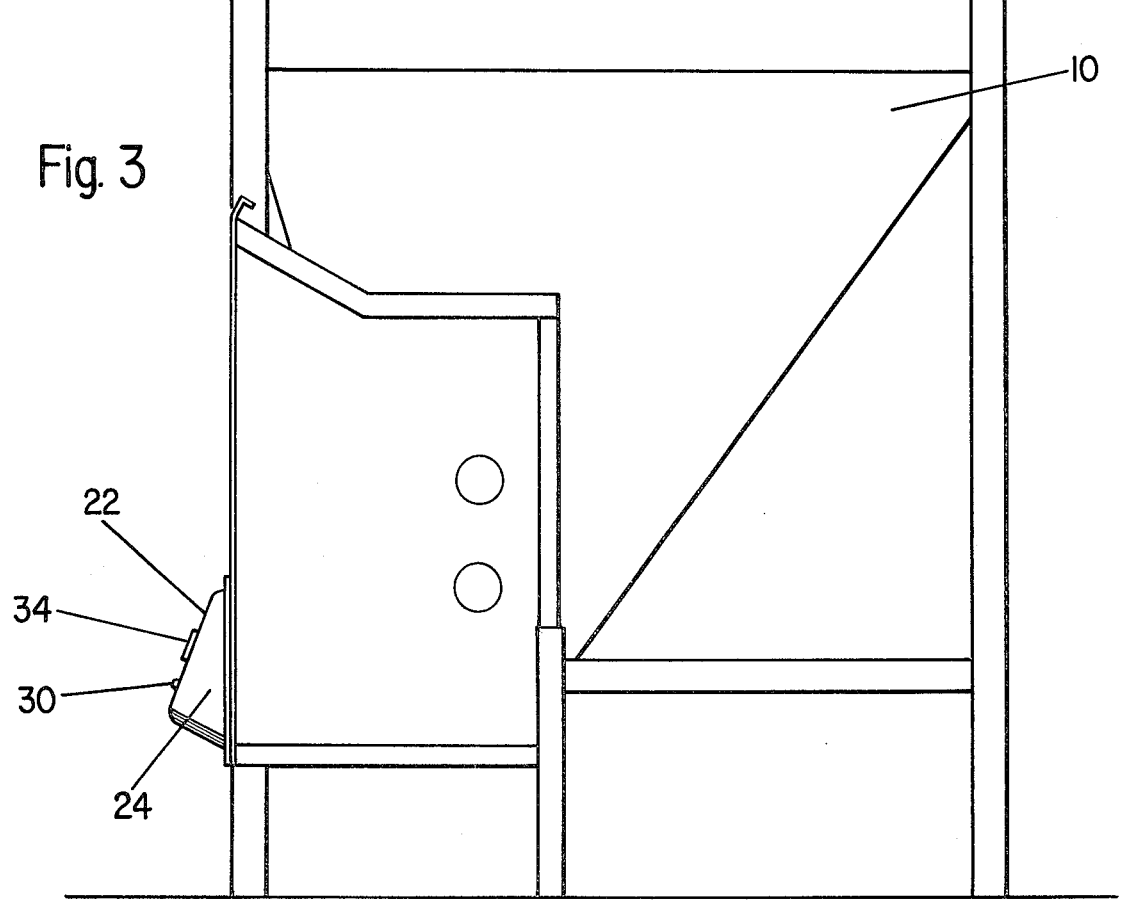
FIG. 3 is a view in side elevation of the embodiment illustrated in FIG. 1.

As illustrated in more detail in FIGS. 2 and 3, the inclined surface 22 of the detector 24 is provided with a plurality of protruding posts 26 through 30. These posts 26 through 30 support the identification tag 18 against further vertically downward movement if the chain 20 slackens due to lowering of the cow's neck.

They also aid in the alignment of the tag in horizontal position to maintain the magnets in the tag in a vertical position parallel with the alignment magnets described below which are associated with the detector.

A pair of horizontally spaced end stops 32 and 34 are located near opposite ends of the detector 24. The top edge of each of the end stops 32 and 34 are tapered to guide the tag 18 down into position between the end stops 32 and 34. The detection switches of the present invention are located between the end stops 32 and 34.

As can be seen from the drawing, the space between the end stops 32 and 34 is considerably greater than the horizontal width of the tag 18. The tag 18 may be positioned anywhere horizontally between the end stops 32 and 34 and thus, the horizontal positioning is not close tolerance.

It will be apparent from the further description that the vertical tolerance is also approximately equal to the height of the tag 18 because of the elongated nature of the magnets which are mounted in the identification tags 18.

Figure 4:
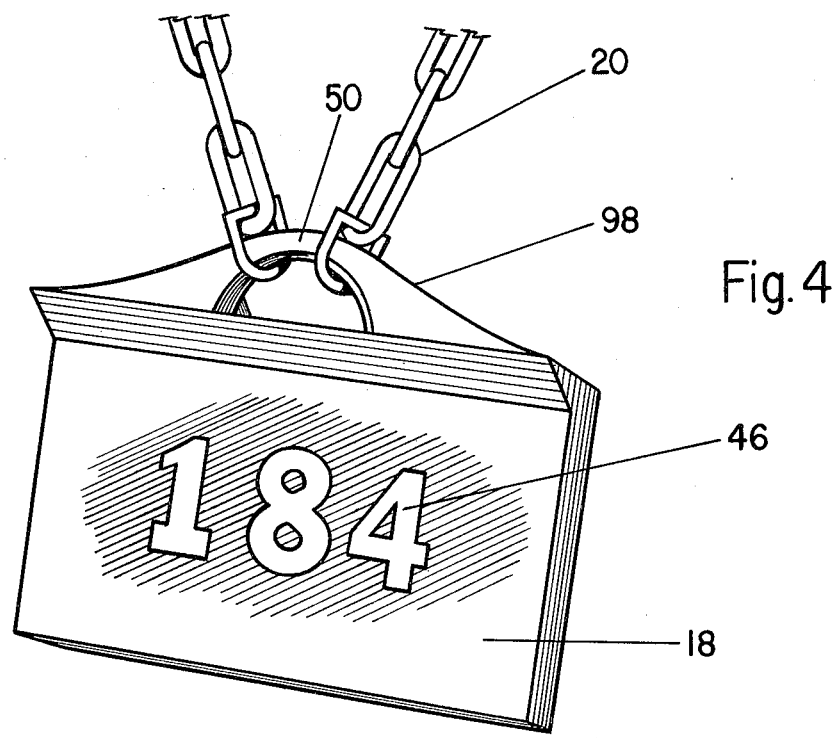
FIG. 4 is a rear view in perspective of an identification tag embodying the present invention.
Figure 5:
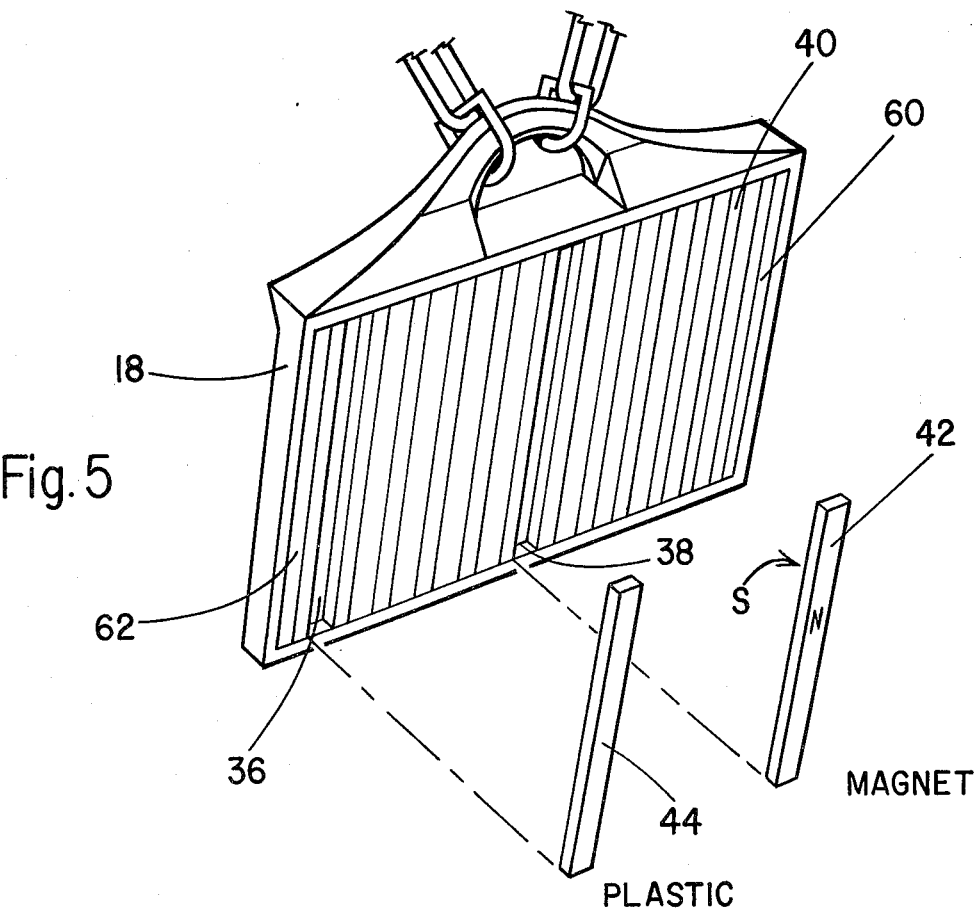
FIG. 5 is a front view in perspective of the tag embodiment of FIG. 4 illustrating the insertion of magnets and nonmagnetic materials into the pockets of the tag.

Identification tags embodying the present invention are coded objects having a plurality of spaced magnet positions as shown in detail in FIGS. 4 and 5. In the preferred embodiment a pocket is formed at each position, such as the pockets 36 and 38 formed into the forward facing surface of the tag 18. Preferably the tags are injection molded of a synthetic resin material. Between each pocket is an integrally formed web 40 separating one pocket from the next. Elongated, permanent magnets such as a barium ferrite bar 42 is frictionally or press fit into selected ones of the pockets, such as the pocket 38. A non-magnetic filler strip, such as a synthetic resin bar 44 of the same dimensions, is press fit into the other pockets. Thus, the selected combinations of magnets and non-magnetic filler strips form a digital code in each tag in a well known manner.

In the preferred embodiment of the invention the magnets, such as the magnet 42 positioned in the tag 18, are polarized transversely of and preferably perpendicularly to the forward facing surface which interfaces with the detector 24. Thus, for example, the forwardly facing side of each magnet in the tag 18 may be a north seeking pole with the inner, rearwardly facing opposite face being a south seeking pole. As an alternative, which is described further below, all poles of all magnets may be reversed so that all forwardly facing surfaces present south seeking poles to the surface of the detector 24.

Preferably, we have found it desirable to utilize 13 pockets per tag and to space them on 0.4 inch centers.

We prefer to construct the magnetic and non-magnetic bars 3 inches long and 0.25 inches wide. The webs of the tags are therefore preferably 0.15 inches in width.

Desirably the identification tag 18 is provided with an arabic numeral 46 on its rearwardly facing surface for visual identification and is formed with a tapered top 48 to reduce the probability of the tag being caught by facilitating its withdrawal from other feed lot structures in which it might get caught. Additionally, the connection loop 50 to which the chain 20 is attached, is rearwardly offset so that the chain will not be wedged between the surface 22 of the detector and the tag and thereby cause the tag magnets to be held away from the detection surface.

Figure 6:
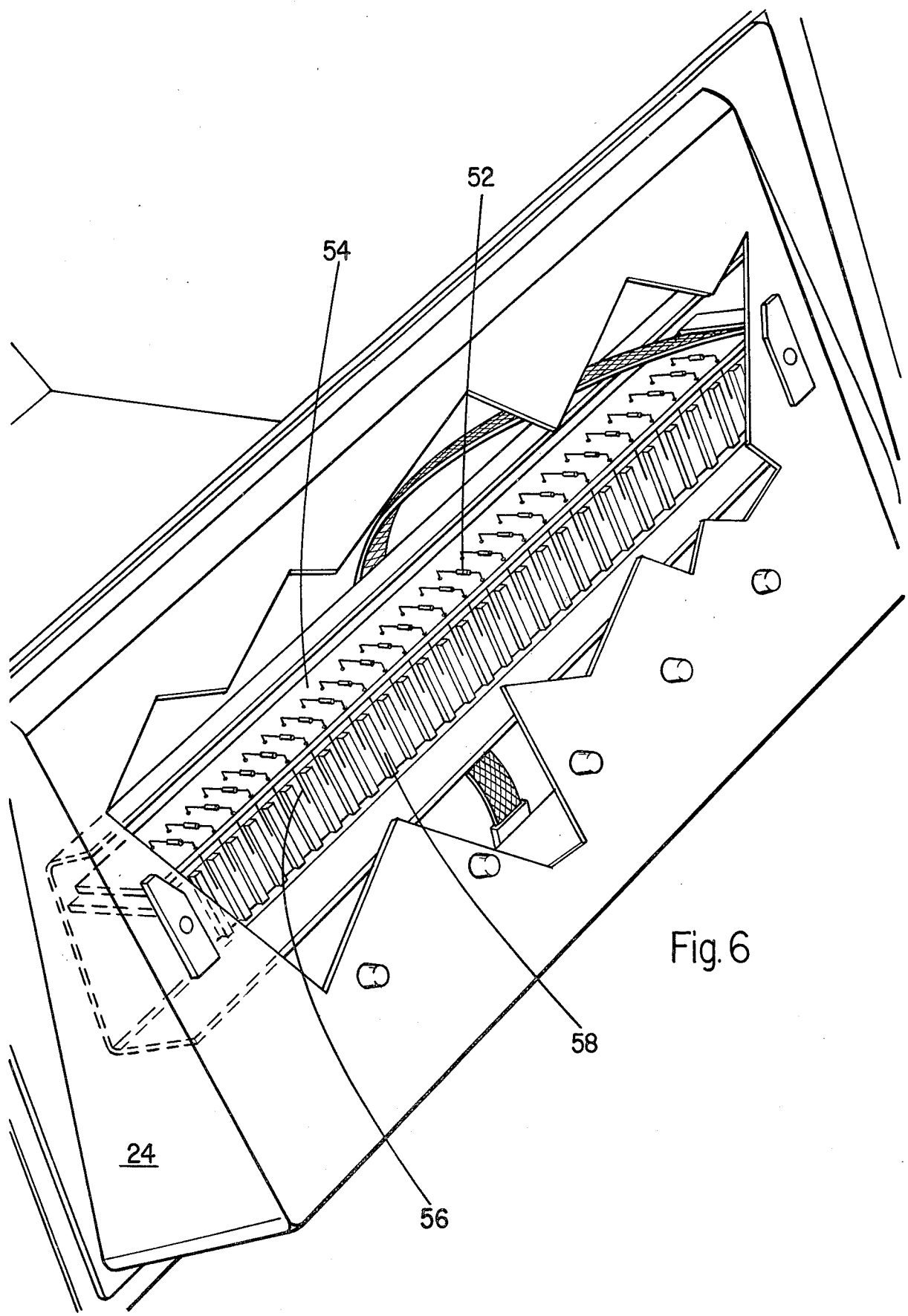
FIG. 6 is a view in perspective and in detail showing a portion of the front panel of the detector illustrated in FIG. 1 broken away to reveal the placement of the reed switches and field modifying magnets of the detector.
Figure 7:
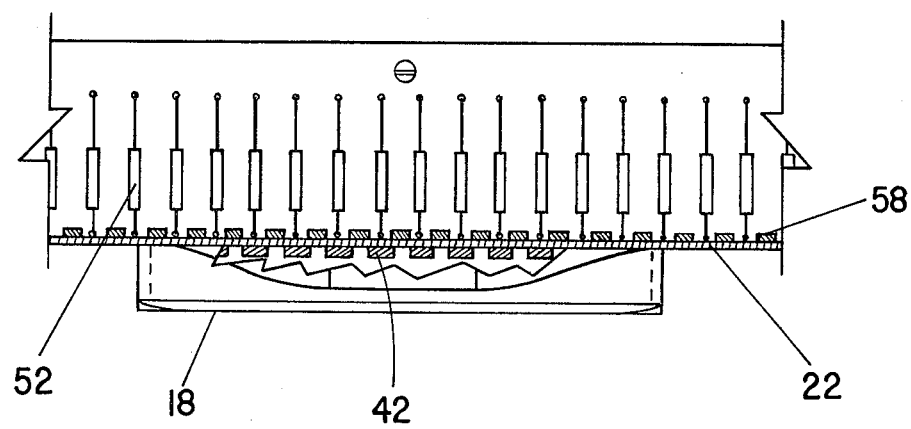
FIG. 7 is a plan view of a portion of the detecting apparatus and cooperating identification tag of the embodiment of FIG. 1.

FIGS. 6 and 7 illustrate the construction of a detector 24 embodying the present invention. In the detector, a plurality of magnetically actuable switches, such as reed switches 52, are spaced along the rear side of the front panel 22 of the detector 24. They are spaced along rearwardly of the front surface which is contacted by the tags and are positioned on spaced centers which are substantially the same as the spacing of the magnets in the tags.

Each reed switch is available to detect the presence of a magnet in the identification tag on the opposite side of the front panel 22. Preferably there are 24 reed switches.

The preferred reed switches are the off center gap type and typically have their reeds aligned with their glass envelope. They are mounted on a printed circuit board 54 with the gap as close as possible to the front panel 22. They are also aligned parallel to the axis of magnetization of the identification tag 18 when it is positioned against the front panel 22 and therefore are aligned substantially perpendicular to the front panel 22.

In order for a reed switch to be actuated, one reed must be in a more north portion of the magnetic field than the other reed. Therefore, they are preferably aligned approximately along the magnetic flux lines. If the reeds were aligned parallel to the front panel 22 of the detector they would not reliably sense the presence of a magnet in the tag because the possibility would exist that they would be aligned perpendicularly to the lines of force and therefore both reeds might lie in an identical magnetic field. Any place where this could happen would be a dead space where the reeds would not close when the tag magnets were close. This is eliminated by mounting them perpendicularly to the front panel 22.

The forwardly extending electrical lead 56 from each reed switch is bent downwardly at approximately right angles to the reeds of the reed switches 52 in order to get the reed gap as close to the front panel 22 as possible and also in order to function as a flux concentrator. Magnetic flux from the tag magnets positioned on the opposite side of the detector front surface 22 will tend to be concentrated in the ferromagnetic electrical leads because of their relatively low reluctance.

As an identification tag 18 approaches the front surface 22 of the detector 24 the flux at each reed switch which has an interfacing tag magnet will increase until it is sufficient to close the reed. It is desirable that all of the reed switches close at approximately the same spacing of the identification tag 18 from the front panel 22. Since manufacturing tolerances cannot be sufficiently precise to control the magnetic field intensity which will cause the reed switches to close, the sensitivity of the reed switches can be adjusted by bending the lead 56 of each reed switch progressively away from or toward the interior surface of the front panel 22. This allows adjustments of the concentrating effectiveness of each lead. The farther the lead is moved away from the panel 22 and thus away from any opposite tag magnet, the closer the magnet must be to actuate the reed switch.

In addition the sensitivity of the reed switches can also be adjusted by trimming away part of the lead. The more the ferromagnetic lead is trimmed, the more the sensitivity of its associated reed switch is decreased.

In order to enhance the sensitivity of the reed switches and to simultaneously aid in the correct alignment of the identification tags with respect to the reed switches 52, a plurality of field modifying magnets 58 are interposed between each of the reed switches 52. The field modifying magnets are also polarized transversely and preferably perpendicularly to the front panel 22 so that their axis of magnetization is substantially parallel to the axis of magnetization of the magnets located in the tag 18. The field modifying magnets are constructed in the preferred embodiment with a width of 0.15 inches.

Additionally, they have a polarity such that all like poles of the field modifying magnets are interfacing identical like poles of the tag magnets. Thus, for example, if the forwardly facing surface of the tags are all north seeking poles, then the outwardly facing surface of all the field modifying magnets 58 which face toward the tag are also north seeking poles. Repelling poles are interfacing.

The field modifying magnets distort the resulting magnetic field by concentrating the magnetic field from the identification tags 18 in the intermediate region between the field modifying magnets where the reed switches and their adjustable leads are physically located. Additionally, the field modifying magnets prevent significant cross talk from one magnet to an adjacent opposite reed switch.

The field modifying magnets also cause a force to be applied to the magnets of identificiation tag 18 repelling them from directly overlaying the field modifying magnets but attracting them to be aligned in the space between the field modifying magnets. Consequently, the tag has forces applied to it which rotates it so that all the magnets of the preferred embodiment are parallel and the magnets of the identification tag 18 are attracted into the positions between the field modifying magnets and directly opposite the reed switches 52.

If opposite poles interfaced they would attract and cause alignment either with the tag magnets opposite the field modifying magnets or obliquely across several permitting a tag magnet to cross over multiple reed switches.

Preferably, the distally spaced end pockets of each of the tags has a magnet 60 and 62 with its outwardly facing surface recessed from the surface of the tag to form sync magnets. The positions between the sync magnets then determine the code and any parity bits which are desired.

Recessing the end sync magnets assures that they will be the last magnets to actuate reed switches. Similar results can also be obtained by making the sync magnets physically smaller or with less magnetization. Therefore, the computer, which repeatedly scans the reed switches, can determine after each scan if reed switches in the preferred embodiment which are 13 spaces apart have been actuated. When reed switches 13 positions apart are actuated, it can be safely assumed that all intermediate reed switches which are supposed to be actuated by magnets are actuated. In this manner the computer can detect when the identification tag 18 is sufficiently close to the front panel 22 of the detector that valid code data is being detected.

An electronic digital computer, which may be a special or general purpose computer, is connected to scan each of the reed switches. The computer is provided with various memory storage elements in which the codes for each tag are stored. In association with each code the farmer stores in the memory in digital format the data representing the feed to be delivered to each animal. Additionally, the computer stores in association with each code number the cumulative time that feed has been delivered to an animal within a selected time period to represent the amount of feed each animal has received in the time period.

In operation an animal which presents itself to the feeder by inserting its head into the feeder will cause its identification tag to be seated in juxtaposition to the reed switches 52. The computer detects the code for the particular animal and compares its total delivered feed for the time period to the total which has been programmed by the farmer for that animal. If the delivered feed is less than the allotted feed the computer actuates the electrically actuated feeder to deliver feed to the animal. Feed continues to be delivered until the animal withdraws from the feeder or uses its entire allotment.

Since such computer operation is extremely simple, fundamental and well known to those skilled in modern computer technology, a further detailed description of that aspect of the embodiment of the invention is not given.

The magnets of the tag which are mounted at the plurality of positions to form a code may be mounted by means other than the physical positioning of discrete physically separate magnets.

For example, the tag may include a unitary piece of magnetizable material. The magnets may be mounted at those positions by simply magnetizing a selected domain of the magnetizable material at the selected positions. The material would provide a unitary body not having physically separate magnets. It, nonetheless, would have separate positions which are magnetized and others which are not.

In still another alternative embodiment of the invention the magnet of the tag may be formed by providing strips of magnetic material such as iron bars in the tag and inducing magnetism in these bars from the circuitry located within the detector 24. In such an embodiment the magnetic material in the tag becomes an electromagnet which is time changing or alternating in polarity. For example, a pluralty of small induction coils may be spaced along the detector in the manner of spacing of the reed switches described above. Each has applied to it an alternating current at a suitable frequency for inducing magnetic fluctuations in the metallic strips located in the identification tag.

Associated with each induction coil is a circuit including a pickup coil or other suitable device which functions as the switch described in the invention to detect the time changing magnetic fields induced in the metallic strips.

Thus, those switches which detect the time changing magnetic field indicate the presence of the metallic strip while those electronic switches which detect considerably less time changing magnetic field detect the absence of a metallic strip.

Although this alternative is more expensive and less reliable than the preferred embodiment described above, it will operate in accordance with principles of the present invention.

It should also be understood that, although the magnets and magnetically actuable switches are generally vertically aligned, they could be generally horizontally aligned or obliquely aligned. Additionally, use of two different alignments at right angles will allow the use of both systems with two feeders each responding to one set of animals and insensitive to the other set.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

We claim:

1. An identification apparatus for electronically detecting a code on one of a plurality of coded objects and comprising:
   (a) a plurality of spaced reed switches mounted to a support capable of receiving a coded object in a plurality of positions;
   (b) a coded object having a plurality of positions spaced substantially the same as the spacing of said reed switches, but of a lesser number than said plurality of said reed switches, said object having magnets mounted at selected ones of said positions for forming said code; and
   (c) electronic means connected to said reed switches for detecting which of said reed switches are closed when said coded object is juxtaposed to any lineal sequence of said reed switches.

2. An apparatus in accordance with claim 1 wherein said reed switches are spaced along a surface and are oriented with their reeds substantially perpendicular to said surface and wherein said magnets are permanent magnets polarized perpendicularly to said surface.

3. An apparatus in accordance with claim 2 wherein the lead from the end of the reed switch closest to said surface is bent at approximately right angles to said reeds.

4. An apparatus in accordance with claim 2 wherein the magnets of said coded object are polarized with like poles facing in the same direction and wherein a plurality of field modifying magnets are interposed between said reed switches along said surface, said field modifying magnets being polarized perpendicularly to said surface and positioned to have all like poles of said field modifying magnets interfacing identically like poles of said object magnets.

5. An animal identification and feeding apparatus comprising:
   (a) an electrically actuable feeder;
   (b) a plurality of magnetically actuable switches spaced along a surface adjacent a feeder;
   (c) a tag attached to each of a plurality of animals to be fed, each tag having a plurality of positions spaced substantially the same as the spacing of said switches, but of a lesser number than said plurality of said switches, each of said tags having permanent magnets mounted at selected ones of said positions; and
   (d) electronic computer means connected to said switches and to said feeder for detecting which of said switches are actuated and for actuating said feeder in response to said detected code word.

6. An apparatus in accordance with claim 5 wherein said switches are reed switches.

7. An apparatus in accordance with claim 6 wherein said reed switches are spaced along a surface and are oriented with their reeds substantially perpendicular to said surface and wherein said magnets are permanent magnets polarized perpendicularly to said surface.

8. An apparatus in accordance with claim 7 wherein the lead from the end of the reed switch closest to said surface is bent at approximately right angles to said reeds.

9. An apparatus in accordance with claim 7 wherein the magnets of said coded object are polarized with like poles facing in the same direction and wherein a plurality of field modifying magnets are interposed between said reed switches along said surface, said field modifying magnets being polarized perpendicularly to said surface and positioned to have all like poles of said field modifying magnets interfacing identically like poles of said object magnets.

10. An apparatus in accordance with claim 5 wherein each of said tags have a pocket formed into a surface of the tag, some of said pockets having magnets inserted therein and other having non-magnetic material inserted therein.

11. An apparatus in accordance with claim 10 wherein the distally spaced pockets of each of said tags has a magnet inserted therein with its outwardly facing surface recessed from said surface of the tag.

12. An apparatus in accordance with claim 10 wherein the distally spaced pockets have a magnet inserted in each which applies a magnetic field to said magnetically actuable switches which is less than the field applied by the other tag magnets.

* * * * *